US008260196B2

(12) United States Patent
Chen et al.

(10) Patent No.: US 8,260,196 B2
(45) Date of Patent: Sep. 4, 2012

(54) ASSEMBLY OF A LOW-NOISE BLOCK CONVERTER AND A FILTER FOR A SATELLITE ANTENNA SYSTEM, AND CONNECTING COMPONENT THEREOF

(75) Inventors: Tzong-Jyh Chen, Taipei Hsien (TW); Chien-Heng Wu, Taipei Hsien (TW); Wei-Jim Yeh, Taipei Hsien (TW)

(73) Assignee: Wistron NeWeb Corp., Taipei Hsien (TW)

( * ) Notice: Subject to any disclaimer, the term of this patent is extended or adjusted under 35 U.S.C. 154(b) by 648 days.

(21) Appl. No.: 12/490,156

(22) Filed: Jun. 23, 2009

(65) Prior Publication Data

US 2010/0136901 A1 Jun. 3, 2010

(30) Foreign Application Priority Data

Dec. 3, 2008 (TW) ............................... 97221645 U

(51) Int. Cl.
*H04B 7/185* (2006.01)

(52) U.S. Cl. .................... 455/13.3; 455/3.02; 455/575.1

(58) Field of Classification Search ................. 455/3.02, 455/11.1, 12.1, 13.3, 575.1

See application file for complete search history.

(56) References Cited

U.S. PATENT DOCUMENTS

| | | | | |
|---|---|---|---|---|
| 7,336,745 | B2 * | 2/2008 | Casabona et al. | 375/346 |
| 7,383,018 | B2 * | 6/2008 | Knutson et al. | 455/3.02 |
| 7,542,742 | B2 * | 6/2009 | Shih et al. | 455/130 |
| 8,086,170 | B2 * | 12/2011 | Petrovic et al. | 455/3.02 |
| 2008/0058036 | A1 * | 3/2008 | Nibe | 455/575.1 |

* cited by examiner

*Primary Examiner* — Nhan Le

(74) *Attorney, Agent, or Firm* — Merchant & Gould P.C.

(57) ABSTRACT

An assembly of a low-noise block converter and a filter for a satellite antenna includes a low-noise block converter, a filter, and a connecting component. The low-noise block converter includes an output circuit, and the filter includes a filtering circuit. The connecting component includes a sleeve part for engaging threadedly the low-noise block converter and the filter, and a core extending through the sleeve part and interconnecting electrically the output circuit and the filtering circuit. By virtue of the sleeve part of the connecting component, connection between the low-noise block converter and the filter can be reinforced to reduce interference. The sleeve part can also serve as a ground circuit between the low-noise block converter and the filter so as to shorten a ground path, thereby reducing signal loss.

9 Claims, 8 Drawing Sheets

ASSEMBLY OF A LOW-NOISE BLOCK CONVERTER AND A FILTER FOR A SATELLITE ANTENNA SYSTEM, AND CONNECTING COMPONENT THEREOF

CROSS-REFERENCE TO RELATED APPLICATION

This application claims priority of Taiwanese Application No. 097221645, filed on Dec. 3, 2008.

BACKGROUND OF THE INVENTION

1. Field of the Invention

The present invention relates to an assembly of a low-noise block converter and a filter for a satellite antenna system, and a connecting component thereof; more particularly to an assembly of a low-noise block converter and a filter for a satellite antenna system with a connecting component that engages threadedly the low-noise block converter and the filter and that serves as a grounding medium therebetween, and a connecting component adapted for engaging threadedly two electronic components and serving as a grounding medium therebetween.

2. Description of the Related Art

A low-noise block converter is a component of a parabolic satellite dish commonly used for satellite signal reception. If a frequency of the satellite signal is greater than 20 GHz, the low-noise block converter is used with a filter for filtering the satellite signal to enhance signal quality.

Referring to FIG. 1, a conventional assembly of a low-noise block converter 11 and a filter 12 for a satellite antenna system is provided with screws 13 (only one is shown) for fastening the low-noise block converter 11 to the filter 12, and signal transmission therebetween is conducted via a connecting component 14. The connecting component 14 includes a core 141 made of a conductive material, and a dielectric layer 142 wrapped around the core 141. The connecting component 14 extends through the low-noise block converter 11 and the filter 12, and a pair of ends of the core 141 connect electrically and respectively with an output circuit 111 disposed in the low-noise block converter 11 and a filtering circuit 121 disposed in the filter 12. Therefore, a satellite signal received by the low-noise block converter 11 is transmitted to the filter 12 through the core 141.

However, there is a problem about connection between the low-noise block converter 11 and the filter 12. Although the filter 12 is fastened to the low-noise block converter 11 by the screws 13, portions of the low-noise block converter 11 and the filter 12 at the connecting component 14 are not as close together compared to portions of the same at the screws 13. Thus, the satellite signal may be disturbed by external interference.

Moreover, when using the conventional connecting component 14 to interconnect electrically the low-noise block converter 11 and the filter 12, a ground signal of the filtering circuit 121 is routed through the metallic screws 13 to the output circuit 111 of the low-noise block converter 11. Accordingly, a ground signal path as indicated by arrows in FIG. 1 is relatively long, and the long ground path results in signal loss during transmission.

As shown in FIG. 2, interference signal power is approximately −64.5 dBm when using the conventional connecting component 12 to interconnect electrically the low-noise block converter 11 and the filter 12.

SUMMARY OF THE INVENTION

In order to solve a problem that portions of a low-noise block converter and a filter for a satellite antenna system are not close enough and a problem that a ground signal path therebetween is too long, an object of the present invention is to ensure that the low-noise block converter and the filter are close enough to each other to reduce interference, and to shorten the ground path to reduce signal loss.

Accordingly, the present invention provides a connecting component that is capable of engaging threadedly the low-noise block converter and the filter, and that also serves as a ground path therebetween.

An assembly of a low-noise block converter and a filter for a satellite antenna system according to this invention comprises a low-noise block converter, a filter, and a connecting component. The low-noise block converter includes a first casing, and an output circuit disposed in the first casing. The filter includes a second casing, and a filtering circuit disposed in the second casing. The connecting component includes a sleeve part and a core. The sleeve part is made of a conductive material and engages threadedly the first casing and the second casing. The core is made of a conductive material, extends through the sleeve part, and interconnects electrically the output circuit and the filtering circuit.

In another aspect, a connecting component of this invention is adapted to electrically connect a first circuit of a first electronic component with a second circuit of a second electronic component.

The connecting component comprises a sleeve part, a core, and a dielectric layer. The sleeve part is made of a conductive material, is in a shape of a circular tube, and has an outer wall surface provided with a screw thread for engaging threadedly the first electronic component and the second electronic component. The core is made of a conductive material, extends through the sleeve part, and has two ends for connecting electrically and respectively with the first circuit and the second circuit. The dielectric layer is disposed in the sleeve part and is wrapped around the core.

The first electronic component could be a low-noise block converter of a satellite antenna system or other electronic components, and the first circuit could be an output circuit of the low-noise block converter. The second electronic component could be a filter or other electronic components, and the second circuit could be a filtering circuit of the filter.

Preferably, the outer wall surface of the sleeve part is provided with the screw thread at portions thereof that are respectively adjacent to distal ends of the sleeve part or at a portion thereof where the two electronic components connect with each other, or an entire portion of the outer wall surface is formed with the screw thread.

The present invention is capable of ensuring closeness between the low-noise block converter and the filter by virtue of the sleeve part of the connecting component to reduce interference. The sleeve part also serves as a ground path between the first and second casings so as to shorten a transmission distance of a ground signal, thereby reducing signal loss during transmission.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 3:
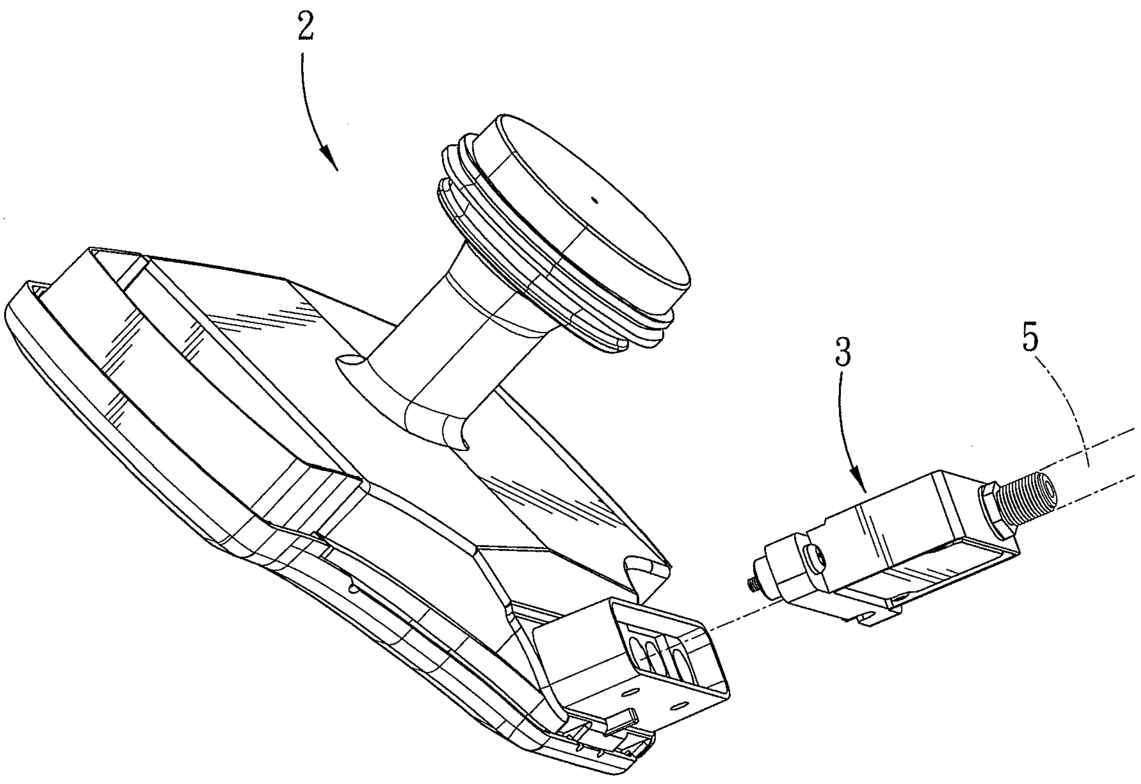
FIG. 3 is an exploded perspective view of a preferred embodiment of an assembly of a low-noise block converter and a filter for a satellite antenna system according to the present invention.
Figure 4:
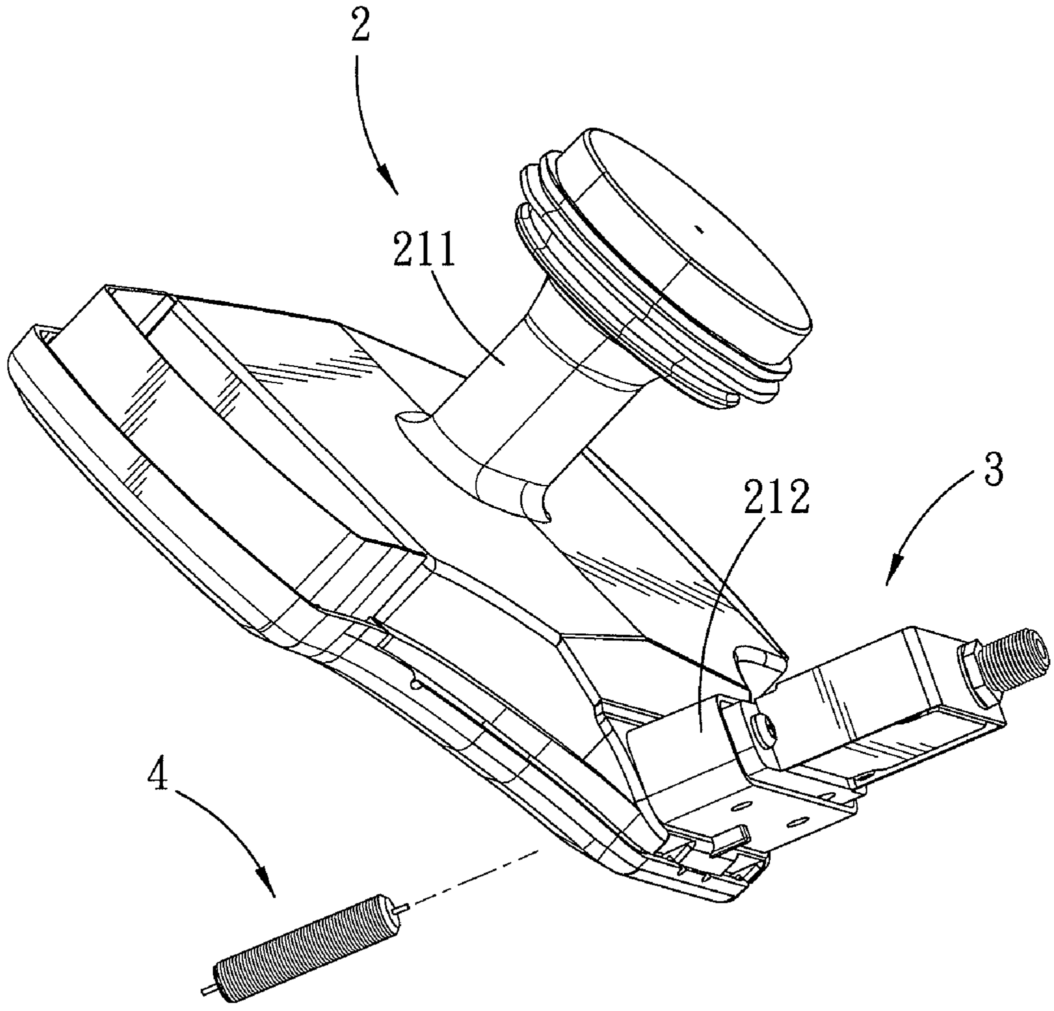
FIG. 4 is perspective view of the assembly of a low-noise block converter and a filter of the preferred embodiment.

Referring to FIGS. 3 and 4, a preferred embodiment of an assembly of a low-noise block converter and a filter for a satellite antenna system according to this invention includes a low-noise block converter 2, a filter 3, and a connecting component 4. The connecting component 4 is used for engaging threadedly the low-noise block converter 2 and the filter 3, and allows transmission of a satellite signal received by the low-noise block converter 3 to the filter 3. The filter 3 filters the satellite signal, and the filtered satellite signal is subsequently transmitted to a client end through a cable 5 that is connected to the filter 3.

Figure 5:
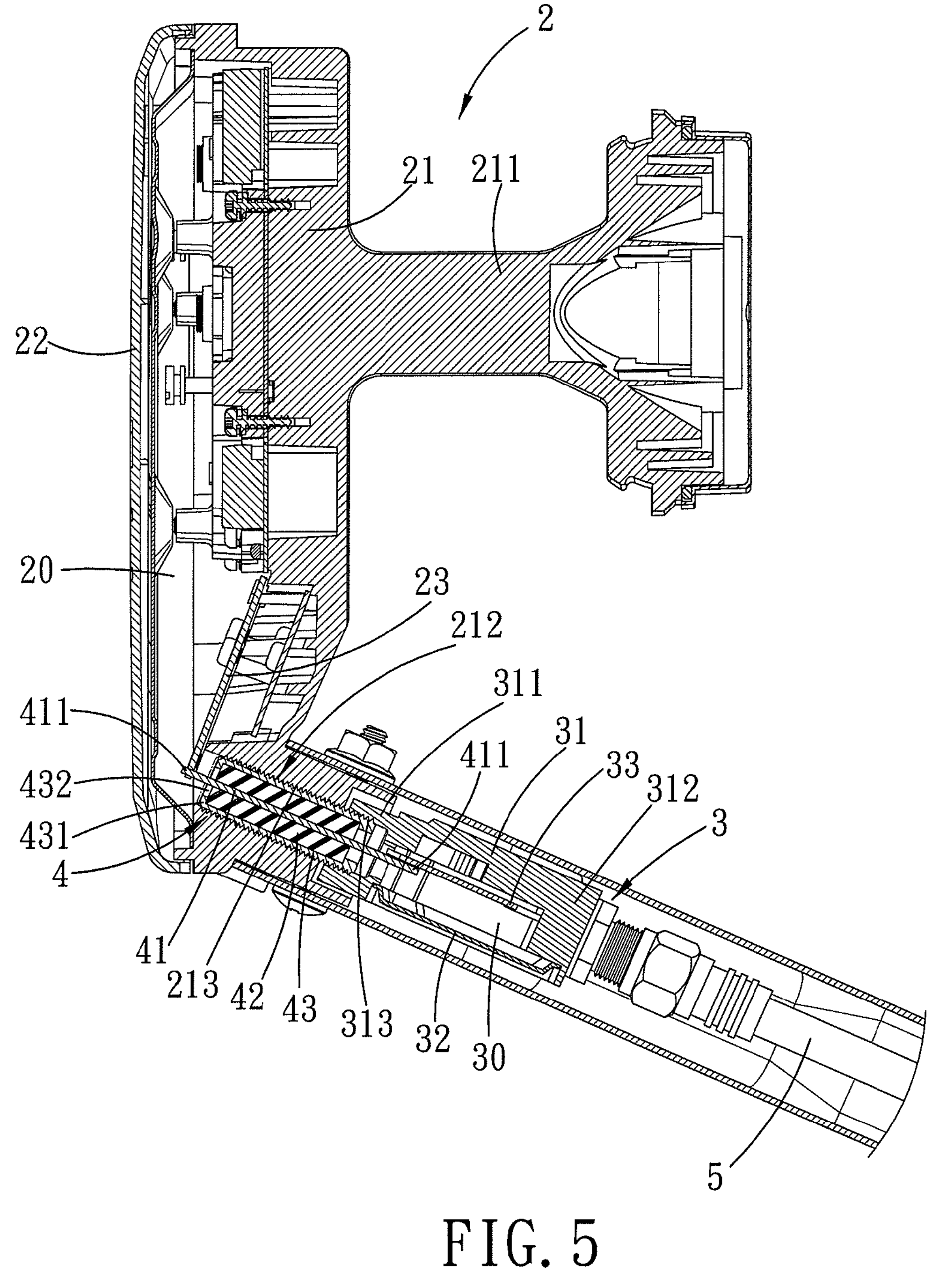
FIG. 5 is a sectional view showing a connecting component of the preferred embodiment threadedly engaging a low-noise block converter and a filter.

Referring to FIGS. 4 and 5, the low-noise block converter 2 includes a first casing 21, a first cover 22, and an output circuit 23. The first casing 21 is made of a conductive material (such as metal), and is formed with a signal feed-in part 211 and a signal output part 212. The first casing 21 and the first cover 22 are connected together, and define a first inner space 20. The output circuit 23 is disposed in the first inner space 20 and is adjacent to the signal output part 212. Certainly, other portions of the first casing 21 and the first inner space 20 are provided with other electronic circuits and electronic components that are necessary for the low-noise block converter 2. Since the feature of the present invention doest not reside in these electronic circuits and electronic components, further details thereof will be omitted herein for the sake of brevity. The signal output part 212 is formed with a first threaded hole 213 in spatial communication with the first inner space 20.

The filter 3 is connected to the signal output part 212 of the low-noise block converter 2. The filter 3 includes a second casing 31 made of a conductive material (such as metal), a second cover 32, and a filtering circuit 33. The second casing 31 and the second cover 32 are connected together, and define a second inner space 30. The filtering circuit 33 is disposed in the second inner space 30. One end of the second casing 31 that is connected to the signal output part 212 is defined as a first end 311, and the other end thereof that is connected to the cable 5 is defined as a second end 312. The first end 311 is formed with a second threaded hole 313 in spatial communication with the second inner space 30.

Referring to FIGS. 5 to 8, the connecting component 4 includes a sleeve part 43, a core 41, and a dielectric layer 42. The core 41 and the sleeve part 43 are both made of a conductive material. The sleeve part 43 is in a shape of a circular tube, and has an outer wall surface provided with a screw thread and a pair of opposite distal ends 431. At least one of the distal ends 431 is formed with a polygonal socket 432. The core 41 extends through the sleeve part 43, and has a pair of opposite ends 411. Each of the ends 411 extends outwardly through a corresponding one of the distal ends 431 of the sleeve part 43. The dielectric layer 42 can be made of the Teflon® with a dielectric coefficient ranging from 3 to 4, and is disposed in the sleeve part 43 and is wrapped around the core 41. The polygonal socket 432 can be a tetragonal socket or a hexagonal socket, and is configured to engage a wrench for driving rotation of the connecting component 4.

Figure 6:
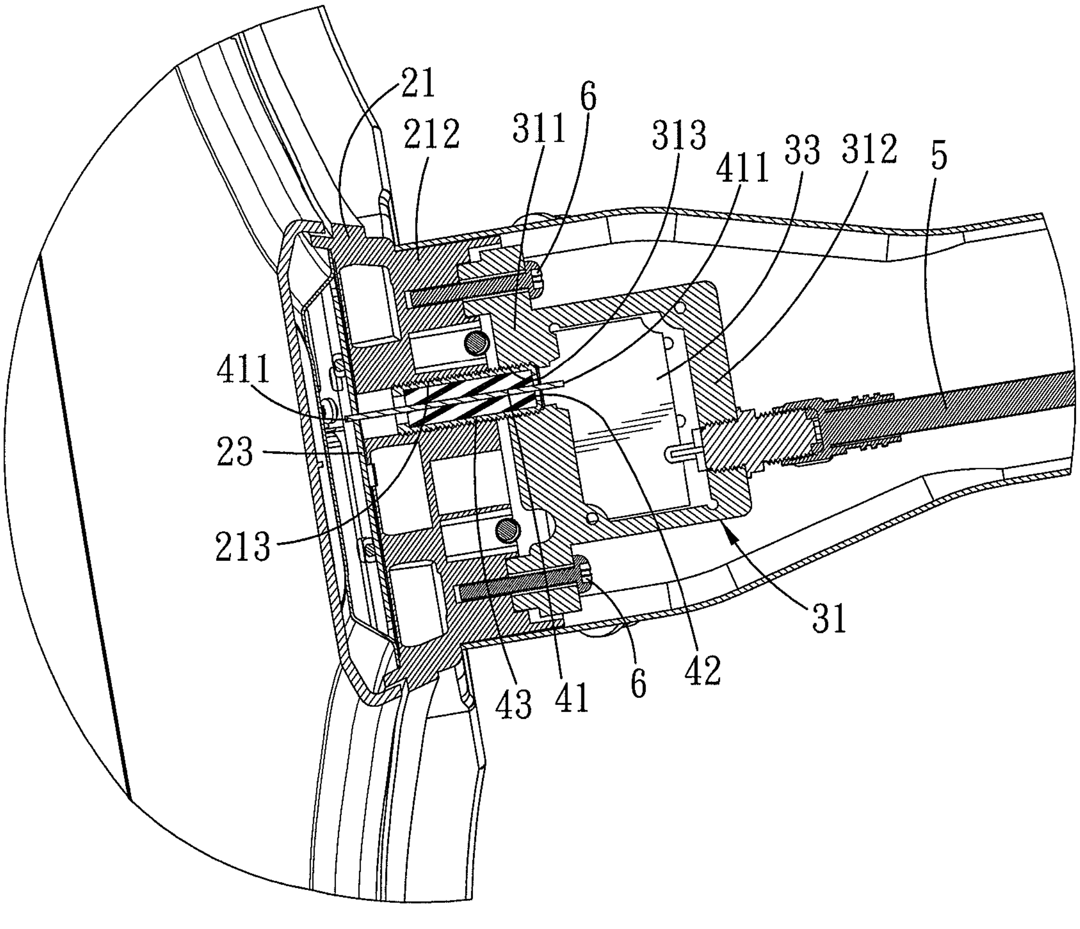
FIG. 6 is another sectional view showing the connecting component of the preferred embodiment threadedly engaging the low-noise block converter and the filter.
Figure 7:
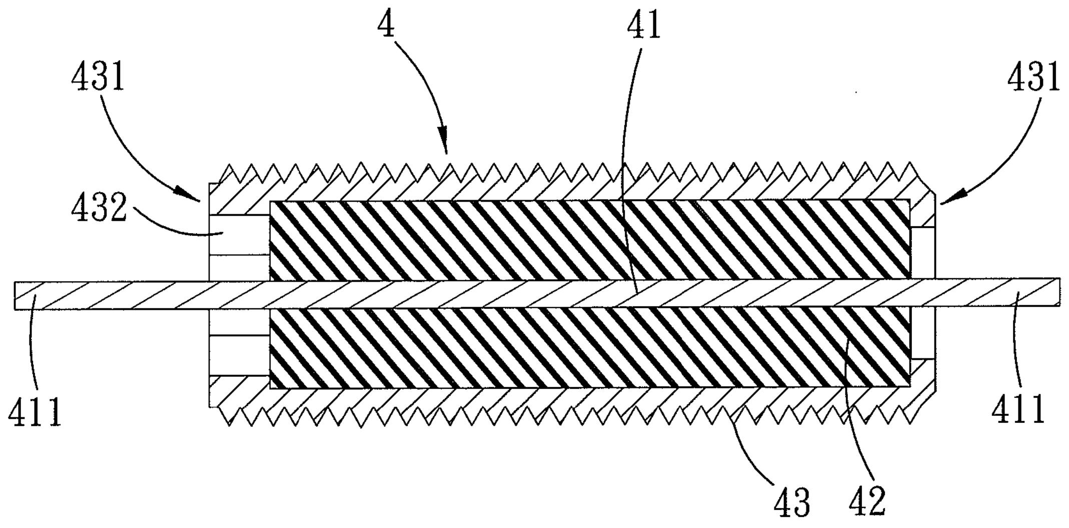
FIG. 7 is a sectional view of the connecting component of the preferred embodiment.
Figure 8:
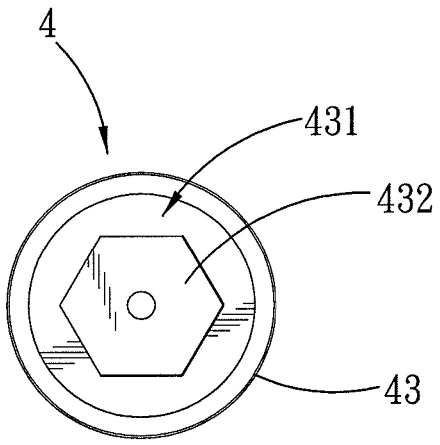
FIG. 8 is an end view of the connecting component of the preferred embodiment.

Referring to FIGS. 5 and 6, when using the connecting component 4 for engaging the low-noise block converter 2 and the filter 3, the first end 311 of the second casing 31 and the signal output part 212 of the first casing 21 are first brought toward each other. In this embodiment, screws 6 are used for fastening the first end 311 of the second casing 31 to the signal output part 212 of the first casing 21 to align the first and second threaded holes 213, 313 with each other. Then, from the first inner space 20 in the first casing 21, the connecting component 4 is screwed between the signal output part 212 of the first casing 21 and the first end 311 of the second casing 31 for engaging threadedly the first casing 21 and the second casing 31. The ends 411 of the core 41 are disposed in the first casing 21 of the low-noise block converter 2 and the second casing 31 of the filter 3, respectively. Subsequently, the output circuit 23 is disposed in the first casing 21 of the low-noise block converter 2, and the filtering circuit 33 is disposed in the second casing 31 of the filter 3, respectively. Each of the output circuit 23 and the filtering circuit 33 is connected electrically to a corresponding one of the ends 411 of the core 41, such as by welding. Finally, other components (such as the first and second cover 22, 23, etc.) are assembled to complete the assembly of the low-noise block converter 2 and the filter 3.

When the connecting component 4 engages threadedly the low-noise block converter 2 and the filter 3, closeness between the first casing 21 of the low-noise block converter 2 and the second casing 31 of the filter 3 can be ensured by virtue of the screw thread on the outer wall surface of the connecting component 4. Therefore, occurrence of a large clearance between the first and second casings 21, 31 can be prevented so as to reduce interference.

Figure 1:
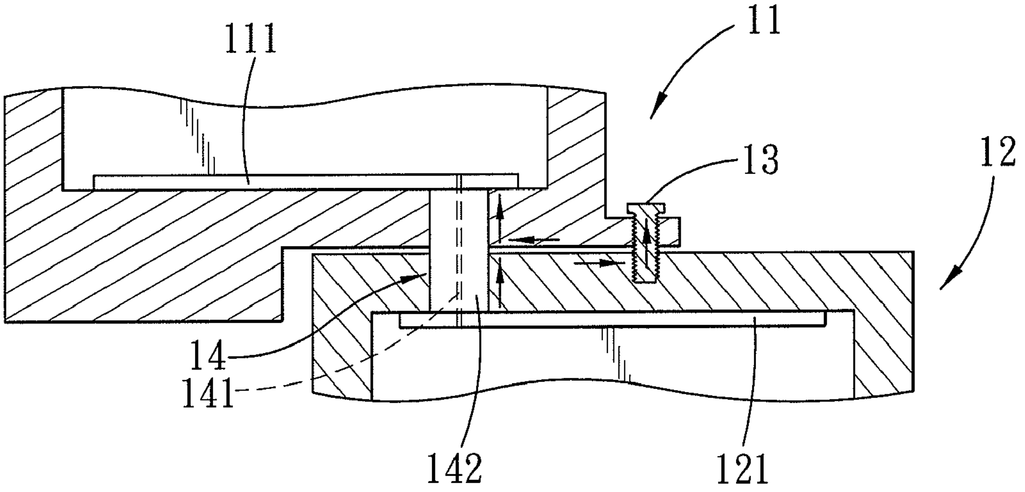
FIG. 1 PRIOR ART
FIG. 1 is a schematic diagram of a conventional assembly of a low-noise block converter and a filter for a satellite antenna system.
Figure 2:
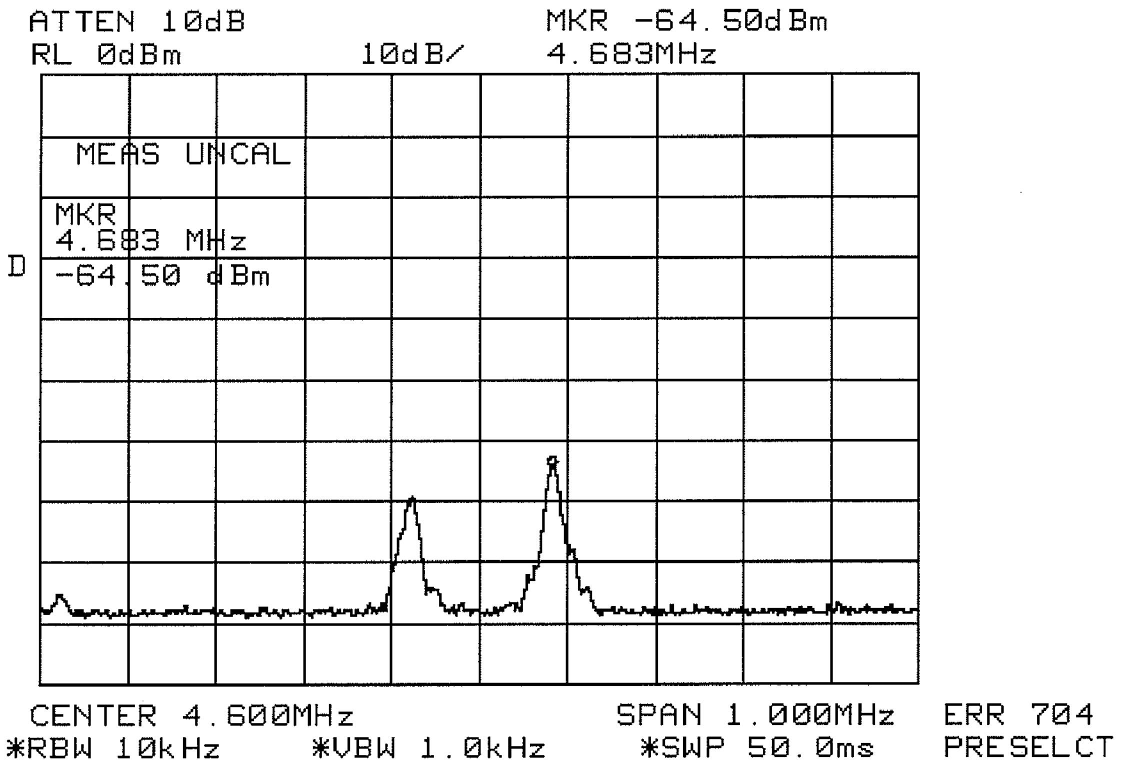
FIG. 2 PRIOR ART
FIG. 2 is a plot indicating interference signal power detected when using the conventional assembly of the low-noise block converter and the filter.

Additionally, since the sleeve part 43 of the connecting component 4 is made of a metal, and is disposed between the first casing 21 of the low-noise block converter 2 and the second casing 31 of the filter 3, the sleeve part 43 can also serve as a ground path for transmitting a ground signal from the filtering circuit 33 to the output circuit 23. Compared with the conventional ground path using the screws 13 shown in FIG. 1, the ground path using the connecting component 4 of this invention is relatively shorter, such that signal loss attributed to a long ground path can be reduced.

It should be noted that, in this embodiment, the polygonal socket 432 in one of the distal ends 431 of the sleeve part 43 is configured to engage a wrench for facilitating screwing of the connecting component 4 into the first threaded hole 213 of the first casing 21 and the second threaded hole 313 of the second casing 31.

Figure 9:
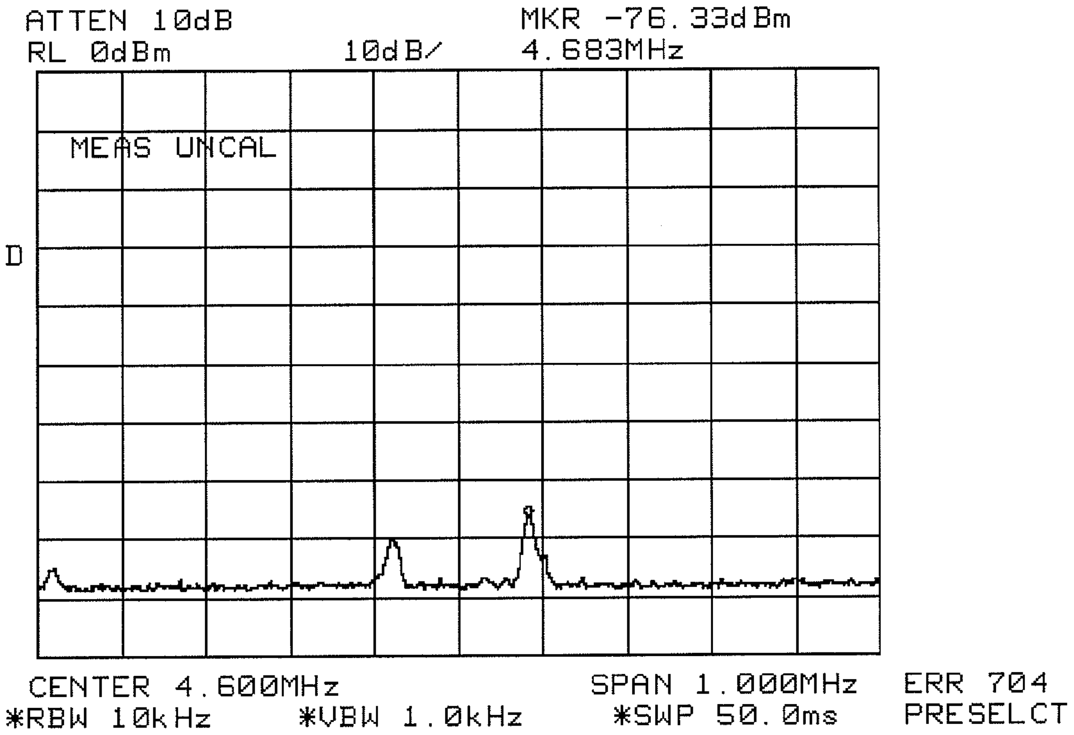
FIG. 9 is a plot indicating the interference signal power when using the assembly of a low-noise block converter and a filter of this invention.

Referring to FIG. 9, interference signal power is approximately −76.3 dBm when using the connecting component 4 of this embodiment to interconnect the low-noise block converter 2 and the filter 3. Compared with the conventional connecting component 12, the present invention certainly has an effect of reducing interference.

Referring to FIG. 5, it should be noted that, in other embodiments, the outer wall surface of the sleeve part 43 of the connecting component 4 can be provided with the screw thread only at a middle portion thereof where the low-noise block converter 2 and the filter 3 connect with each other, or at portions thereof that are respectively adjacent to distal ends 413 rather than at the middle portion thereof. Compared with the conventional connecting component 12 shown in FIG. 1, the connecting component 4 can ensure the closeness between the low-noise block converter 2 and the filter 3 to reduce interference.

In sum, by virtue of the connecting component 3 capable of engaging threadedly the low-noise block converter 2 and the filter 3, the present invention is capable of ensuring the closeness between the low-noise block converter 2 and the filter 3 to reduce interference. Additionally, the sleeve part 43 also serves as a ground path between the low-noise block converter 2 and the filter 3 so as to shorten a transmission distance of a ground signal for reducing signal loss during transmission.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. An assembly of a low-noise block converter and a filter for a satellite antenna system, said assembly comprising:

a low-noise block converter including a first casing made of a conductive material, and an output circuit disposed in said first casing;

a filter including a second casing made of a conductive material, and a filtering circuit disposed in said second casing; and a connecting component including a sleeve part made of a conductive material and engaging threadedly said first casing and said second casing, and a core that is made of a conductive material, that extends through said sleeve part, and that interconnects electrically said output circuit and said filtering circuit.

2. The assembly of a low-noise block converter and a filter for a satellite antenna system as claimed in claim 1, wherein said sleeve part is in a shape of a circular tube, and has an outer wall surface, at least a portion of said outer wall surface being provided with a screw thread for engaging threadedly said first casing and said second casing.

3. The assembly of a low-noise block converter and a filter for a satellite antenna system as claimed in claim 2, wherein said sleeve part further has a pair of opposite distal ends, and said outer wall surface of said sleeve part is provided with said screw thread at least at portions thereof that are respectively adjacent to said distal ends of said sleeve part.

4. The assembly of a low-noise block converter and a filter for a satellite antenna system as claimed in claim 2, wherein an entire portion of said outer wall surface is formed with said screw thread.

5. The assembly of a low-noise block converter and a filter for a satellite antenna system as claimed in claim 2, wherein said sleeve part further has a pair of opposite distal ends, and at least one of said distal ends of said sleeve part is formed with a polygonal socket.

6. The assembly of a low-noise block converter and a filter for a satellite antenna system as claimed in claim 5, wherein said core of said connecting component has a pair of opposite ends, and each of said ends of said core extends outwardly through a corresponding one of said distal ends of said sleeve part.

7. The assembly of a low-noise block converter and a filter for a satellite antenna system as claimed in claim 1, wherein:

said first casing of said low-noise block converter is formed with a first threaded hole;

said second casing of said filter is formed with a second threaded hole;

said first and second casings are brought toward each other to align said first and second threaded holes with each other; and said connecting component extends into said first and second threaded holes and engages threadedly said first casing and said second casing.

8. The assembly of a low-noise block converter and a filter for a satellite antenna system as claimed in claim 7, wherein said first casing includes a signal output part formed with said first threaded hole, said output circuit is disposed adjacent to said signal output part, and said assembly further comprises screws for fastening said second casing to said signal output part of said first casing.

9. The assembly of a low-noise block converter and a filter for a satellite antenna system as claimed in claim 1, wherein said connecting component further includes a dielectric layer disposed in said sleeve part and wrapped around said core.

* * * * *